US006247876B1

(12) United States Patent
Stephens

(10) Patent No.: US 6,247,876 B1
(45) Date of Patent: Jun. 19, 2001

(54) PORTABLE, GAS-POWERED, GENERAL PURPOSES, PNEUMATIC TRANSPORT DEVICE

(76) Inventor: Robert E. Stephens, 1558 David Pl., Traverse City, MI (US) 49686

( * ) Notice: Subject to any disclaimer, the term of this patent is extended or adjusted under 35 U.S.C. 154(b) by 0 days.

(21) Appl. No.: 09/166,417

(22) Filed: Oct. 5, 1998

(51) Int. Cl.[7] .................................................. B60P 1/60
(52) U.S. Cl. ............................................................ 406/39
(58) Field of Search ........................................ 406/38, 39

(56) References Cited

U.S. PATENT DOCUMENTS

| | | | |
|---|---|---|---|
| 2,381,762 | * 8/1945 | McConkle | 406/39 |
| 3,155,431 | * 11/1964 | Baldwin | 406/39 |
| 4,058,227 | 11/1977 | Shakshober et al. | 214/13 |
| 4,098,412 | 7/1978 | Shakshober | 214/15 D |
| 4,129,338 | 12/1978 | Mudgett | 302/2 A |
| 4,165,133 | 8/1979 | Johnson | 406/109 |
| 4,560,307 | 12/1985 | Deitesfeld | 406/63 |
| 5,199,174 | 4/1993 | Wild | 30/123.3 |
| 5,639,033 | 6/1997 | Miller et al. | 241/57 |

FOREIGN PATENT DOCUMENTS

574596 * 12/1993 (DE) ...................................... 406/39

* cited by examiner

Primary Examiner—Christopher P. Ellis
Assistant Examiner—Joe Dillon, Jr.
(74) Attorney, Agent, or Firm—John Gugliotta

(57) ABSTRACT

A portable, gas-powered, general purpose, pneumatic transport device is disclosed, comprising a pneumatic transfer system in which a gas powered engine is used to drive a high-volume blower system.

9 Claims, 4 Drawing Sheets

PORTABLE, GAS-POWERED, GENERAL PURPOSES, PNEUMATIC TRANSPORT DEVICE

BACKGROUND OF THE INVENTION

1. Field of the Invention

The present invention relates generally to particulate matter transport device and, more particularly, to a portable, gas-powered, general purpose, pneumatic transport device.

2. Description of the Related Art

From large-scale industrial operations down to residential home situations, many people are faced with transporting large volumes of materials from place to place. Among these materials is the category that includes granular and similar substances such as sawdust, leaves, sand, dirt and other similar materials that typically requires the use of a range of equipment from shovels and wheel barrows to front-end loaders and dump trucks, depending upon the amount of material being moved. In either case, the task is burdensome in the sense that several repetitious operations are required in order to complete the job.

Furthermore, these methods make it difficult to move the materials in a complete manner, especially in the case of granular substances, due to the inability of the equipment to pick up the material completely. As a result, these operations suffer from inefficiencies that result in wasted time and, in the industrial setting, wasted money. Accordingly, there is a need for a means by which these materials can be transported efficiently and completely, thus minimizing the time and costs associated therewith.

Conventional material transport means tend to suffer from the aforementioned draw backs in part due to the extremely small size of individual pieces of material. The use of large shovels and front-end loaders makes it virtually impossible to do a complete job and tend to slow the process due to the repetitive nature of these operations.

In the previous art, several patents disclose portable blowers used to feed cellulose insulation into a building structure. These include U.S. Pat. No. 5,639,033, issued in the name of Miller et al., U.S. Pat. No. 4,560,307, issued in the name of Deitesfeld, and U.S. Pat. No. 4,129,338, issued in the name of Mudgett.

Several patents disclose blower systems used to transport granular materials typically stored in silos such as corn, grain, etc. However, these devices are generally mounted in a permanent manner near or upon the silo itself. These include U.S. Pat. No. 4,165,133, issued in the name of Johnson, U.S. Pat. No. 4,098,412, issued in the name of Shakshober, and U.S. Pat. No. 4,058,227, issued in the name of Shakshober et al.

U.S. Pat. No. 5,199,174, issued in the name of Wild, discloses a sawdust removal apparatus for collecting dust from power tools. While this device is not directly related to the present invention, it is included for reference purposes.

The problem with many of these devices is that the particulate matter must be manually fed into the main housing of the invention, thus still requiring significant manual labor on the part of the operator. No easy means of transporting the material from the pile to the invention is disclosed. Also, many of these devices are electrically powered, and necessitate use of the invention near an electrical outlet. Thus, the scope of application is severely limited.

Many of these devices rely on gravity feeding to place the particulate matter into the device before it is pneumatically moved to another location. This type of configuration increases the risk of blockages of the inlets into the device.

A search of the prior art did not disclose any patents that read directly on the claims of the instant invention. Consequently, a need has been felt for providing an apparatus and method which overcome the problems cited above.

SUMMARY OF THE INVENTION

It is therefore an object of the present invention to provide an improved portable, gas-powered, general purpose, pneumatic transport device that facilitates the movement of particulate matter from one location to another without the necessity of shoveling the material either between the two locations or from the first location into the transport device.

Briefly described according to one embodiment of the present invention, a portable, gas-powered, general purpose, pneumatic transport device is disclosed, comprising a pneumatic transfer system in which a gas powered engine is used to drive a high-volume blower system.

The present invention acts as a pump that is capable of moving a variety of substances from place to place with a minimum amount of time and effort and in a complete manner, due to its continuous, high-volume transfer rate.

It is envisioned that the present invention consists of a suction tube and a discharge tube, both being of a flexible, linearly elongated, hollow configuration.

The main body of the present invention is of a generally rectangular configuration, with an internal cavity into which the granular material passes. Attached to the upper surface of the main body is a gas powered engine of otherwise conventional two or four stroke design, designed to function as both a suction device and a blower device. A power transfer means, such as a drive belt or steel pulley, is connected to the gas powered engine, and functions to turn a rotary blade, said rotary blade located in the main body.

A control means is located on the external surface of the main body, and is designed to permit multi-speed applications of the gas powered engine. As such, the suction and blowing capacity of the present invention can be adjusted according to the density of the particulate material.

It is envisioned that a plurality of wheels are positioned on the lower surface of the main body, thus facilitating ease of movement of the present invention and eliminating the necessity of carrying the main body to and from its operating location.

The present invention is designed such that the rotary blade does not come into contact with the granular material, thus reducing the risk of clogging of the cavities and explosion from sparks.

The rotary blade provides both the suction, bringing particulate matter into the main body, and acts as a compressed air blower, forcing air outward through the blower tube.

An air intake is located in the main body, and is designed to facilitate the transfer of air from the main body to the discharge tube.

The main body has a suction inlet and a blower discharge outlet. The suction tube is releasable secured to the suction inlet, and the blower tube is releasably secured to the blower discharge outlet. In operation, the device acts as a high-volume transfer system by directing the suction tube to the material that is to be moved and directing the discharge tube to the destination, whether it be a transfer vehicle or another location. It is envisioned that the present invention will be constructed in a variety of sizes and configurations that will accommodate both home and industrial use.

It is envisioned that the main body be comprised of material selected from the group comprising metal and plastic, with the suction tube and discharge tube being constructed of a material selected from the group comprising rubber or plastic.

It is another object of the present invention to provide a device that can be used on many granular and powdered substances, such as sand, dirt, flour, leaves, mulch, grass and sawdust.

It is another object of the present invention to provide a device that provides for a continuous, high-volume transfer rate of material.

It is another object of the present invention to provide a device that eliminates the use of shovels and heavy equipment for the removal of material from one location to another or from the original pile to the device.

It is another object of the present invention to provide a device that completely removes materials, by providing a strong source of suction and discharge power.

It is another object of the present invention to provide for a device that does not use gravity to facilitate movement of the particulate matter.

It is another object of the present invention to provide for a device that is lightweight and portable, thus facilitating transport to a variety of locations.

Descriptive Key
10 a portable, gas-powered, general purpose, pneumatic transport device
20 gas powered engine
30 suction tube
40 discharge tube
50 main body
60 internal cavity
70 power transfer means
80 rotary blade
90 control means
100 wheel
110 air intake
120 suction inlet
130 discharge outlet

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

In order to describe the complete relationship of the invention, it is essential that some description be given to the manner and practice of functional utility and description of a portable, gas-powered, general purpose, pneumatic transport device 10.

Figure 1:
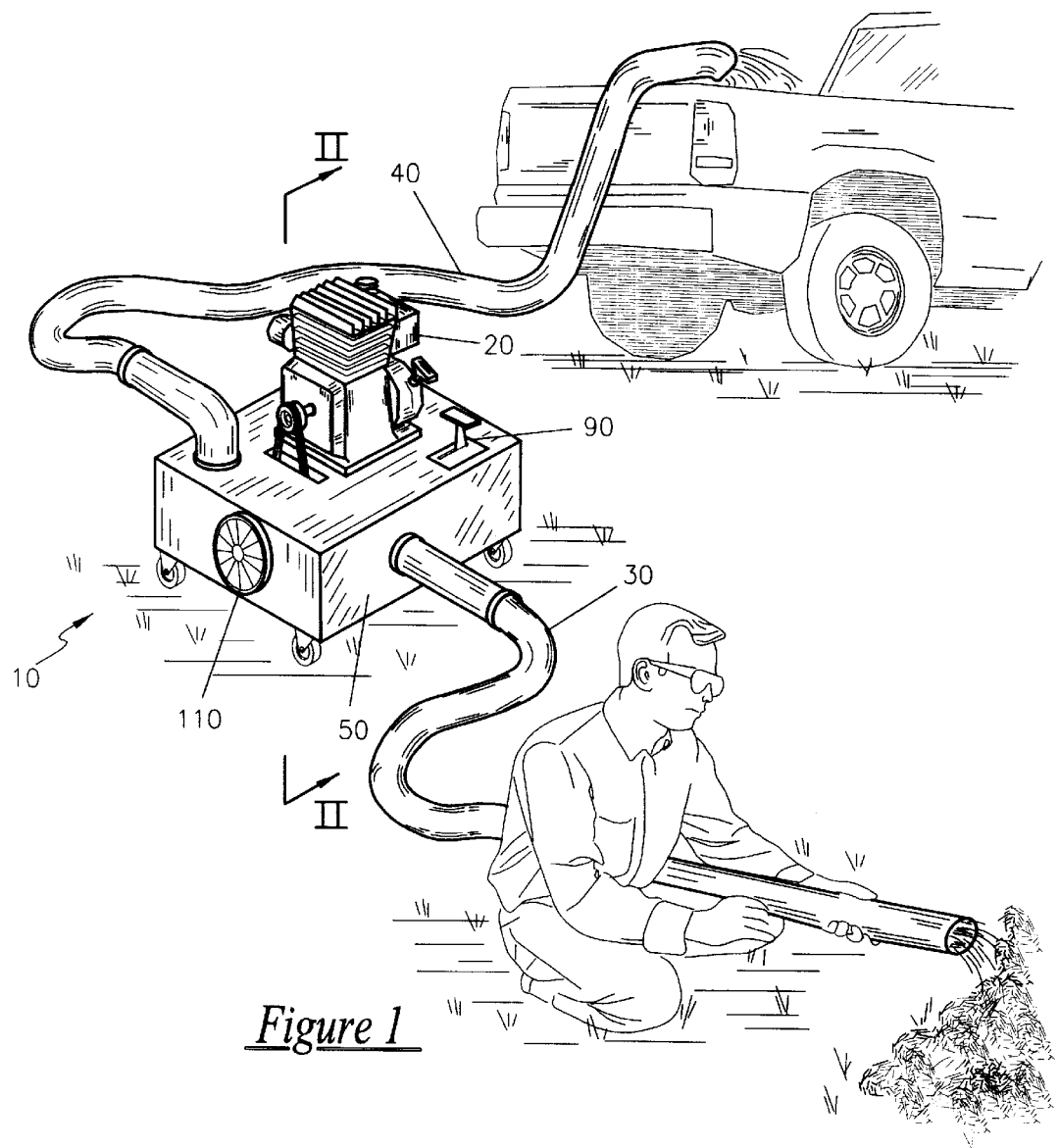
FIG. 1 is a perspective, in-use view of the preferred embodiment of a portable, gas-powered, general purpose, pneumatic transport device 10.
Figure 2:
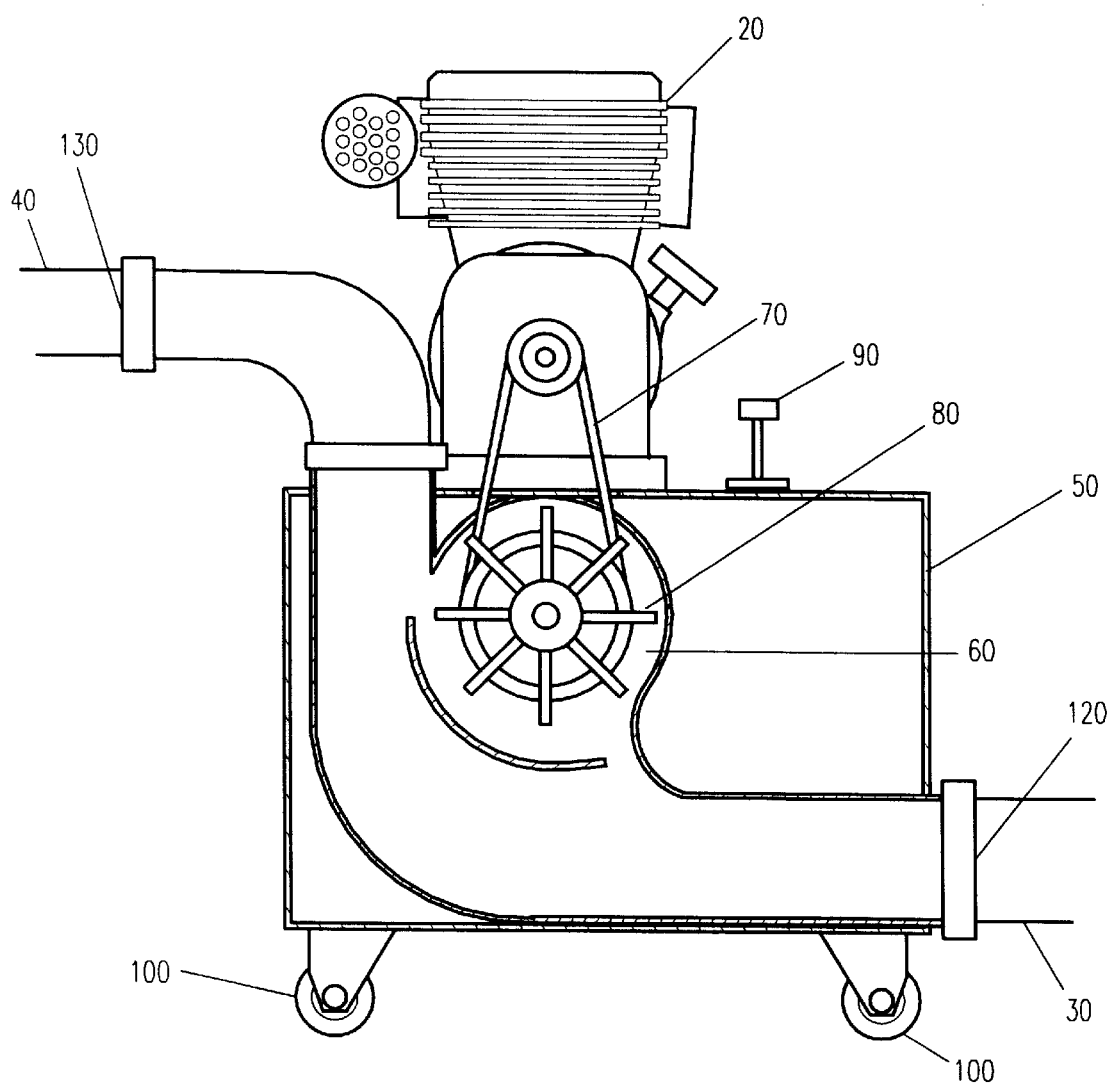
FIG. 2 is a cross-sectional view of the internal cavity and rotary blade cut along line II—II.
Figure 3:
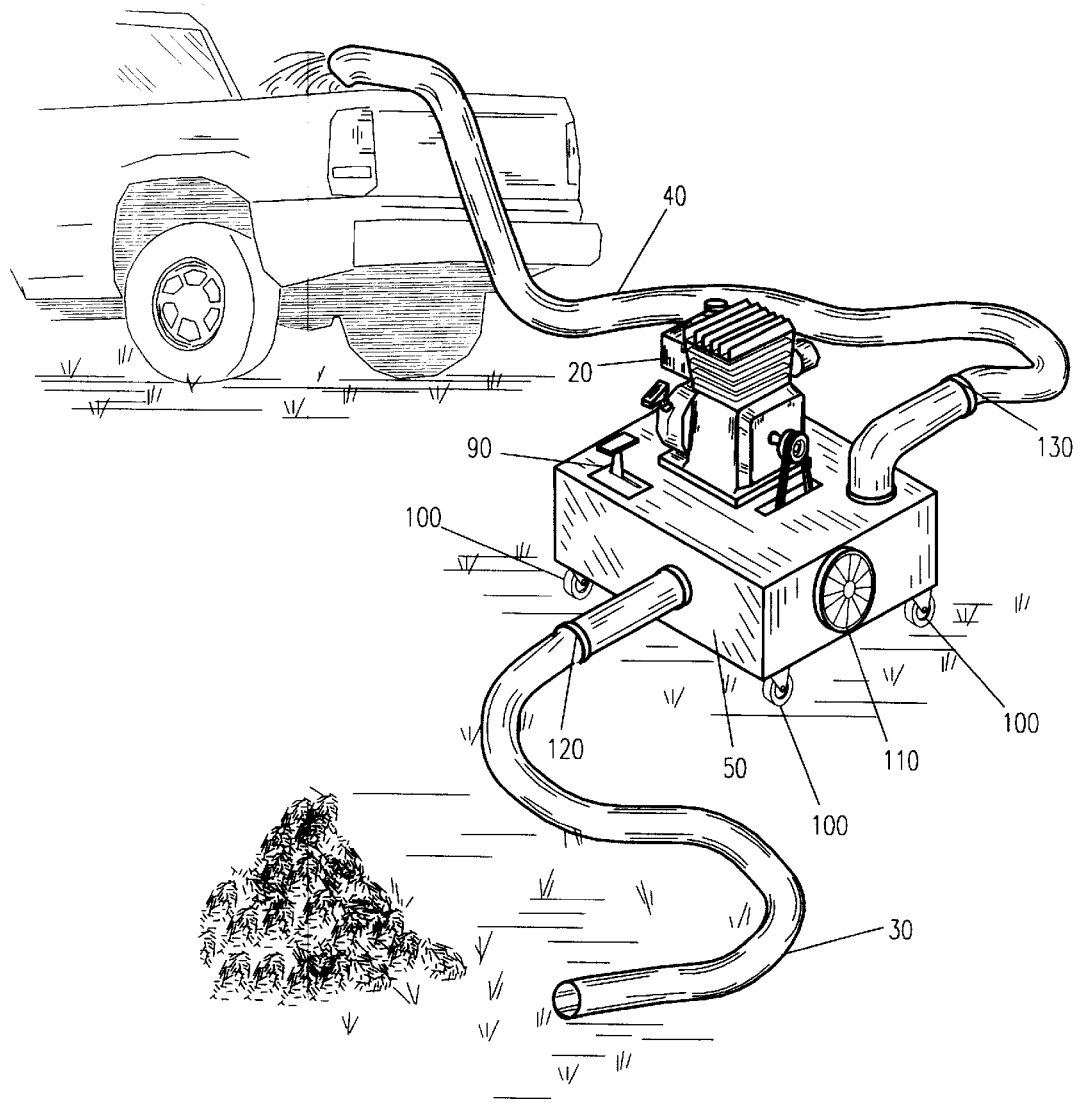
FIG. 3 is a side view of the preferred embodiment of the present invention.

The best mode for carrying out the invention is presented in terms of its preferred embodiment, herein depicted within the FIGS. 1 through 3.

1. Detailed Description of the Figures

Referring now to FIG. 1, a portable, gas-powered, general purpose, pneumatic transport device 10 is shown, according to the present invention, comprises a pneumatic transfer system in which a gas powered engine 20 is used to drive a high-volume blower system.

The present invention acts as a pump that is capable of moving a variety of substances from place to place with a minimum amount of time and effort and in a complete manner, due to its continuous, high-volume transfer rate.

It is envisioned that the present invention consists of a suction tube 30 and a discharge tube 40, both being of a flexible, linearly elongated, hollow configuration.

The main body 50 of the present invention is of a generally rectangular configuration, with an internal cavity 60 (not shown) into which the granular material passes. Attached to the upper surface of the main body 50 is a gas powered engine 20 of otherwise conventional two or four stroke design, designed to function as both a suction device and a blower device. A power transfer means 70, such as a drive belt or steel pulley, is connected to the gas powered engine 20, and functions to turn a rotary blade 80 (not shown), said rotary blade 80 located in the main body 50.

Referring now to FIGS. 2 & 3, the rotary blade 80 is located in the internal cavity 60 of the main body 50, and facilitates the movement of air and particulate matter into the main body 50, through the rotary blade 80, and out the discharge tube 40.

A control means 90 is located on the external surface of the main body 50, and is designed to permit multi-speed applications of the gas powered engine 20. As such, the suction and blowing capacity of the present invention can be adjusted according to the density of the particulate material.

It is envisioned that a plurality of wheels 100 are positioned on the lower surface of the main body 50, thus facilitating ease of movement at a loading or unloading station of the main body 50, thus eliminating the necessity of carrying the main body to its new position.

The rotary blade 80 provides both the suction, bringing particulate matter into the main body 50, and acts as a compressed air blower, forcing air outward through the (blower) discharge tube 40.

An air intake 110 is located in the main body 50, and is designed to facilitate the transfer of air from the main body 50 to the discharge tube 40.

Figure 4:
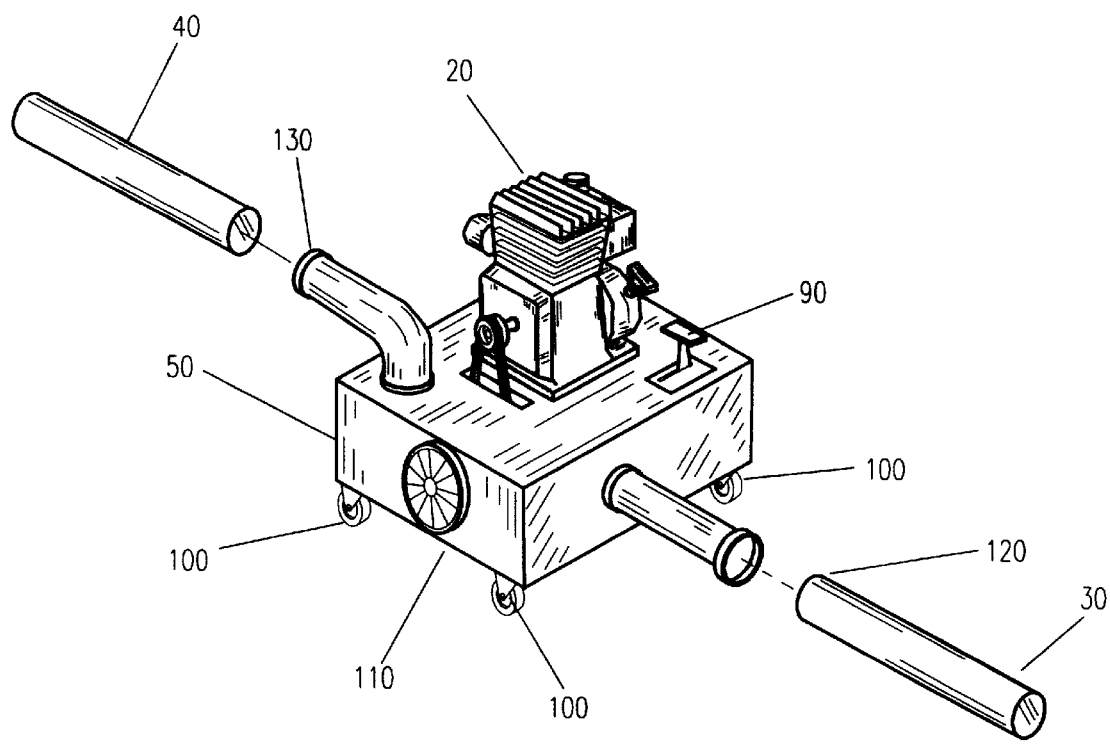
FIG. 4 is an exploded view of the suction tube and discharge tube of the preferred embodiment of the present invention.

Referring now to FIG. 4, the main body 50 has a suction inlet 120 and a blower discharge outlet 130. The suction tube 30 is releasable secured to the suction inlet 120, and the blower discharge tube 40 is releasably secured to the blower discharge outlet 130. In operation, the device acts as a high-volume transfer system by directing the suction tube 30 to the material that is to be moved and directing the discharge tube 40 to the destination, whether it be a transfer vehicle or another location. It is envisioned that the present invention will be constructed in a variety of sizes and configurations that will accommodate both home and industrial use.

It is envisioned that the main body be comprised of material selected from the group comprising metal and plastic, with the suction tube and discharge tube being constructed of a material selected from the group comprising rubber or plastic.

It is envisioned that other styles and configurations of the present invention can be easily incorporated into the teachings of the present invention, and only one particular configuration shall be shown and described for purposes of clarity and disclosure and not by way of limitation of scope.

2. Operation of the Preferred Embodiment

To use the present invention: first, move the main body 50 near the pile of particulate matter; second, attach suction tube 30 to the suction inlet 120 and the discharge tube 40 to the blower discharge outlet 130; third, place the suction tube 30 end into a pile of particulate matter, such as sawdust; fourth, place the discharge tube 40 end into a container of wherever the operator wishes to place the particulate matter, such as a truck bed; fifth, turn on the present invention.

The foregoing description is included to illustrate the operation of the preferred embodiment and is not meant to limit the scope of the invention. The scope of the invention is to be limited only by the following claims.

What is claimed is:

1. A portable, gas-powered, pneumatic transport device, said transport device comprising:

a main body, of generally rectangular configuration, with an internal cavity into which granular and particulate material passes;

a, multi-speed gas powered engine, said gas powered engine attached to the upper surface of said main body, and said gas powered engine being of a conventional two or four stroke design, said gas powered engine designed to function as both a suction which sucks air into the body device and a blower device which discharges air from the body;

a rotary blade, said rotary blade used to create the suction and blower functions, said rotary blade located in said internal cavity;

a power transfer means, said power transfer means operably connected to said gas powered engine, and functioning to turn said rotary blade;

a suction inlet, said suction inlet located on said main body;

a blower discharge outlet, said blower discharge outlet located on said main body;

a suction tube, said suction tube being of a flexible, linearly elongated, hollow configuration, and connecting to said suction inlet;

a discharge tube, said discharge tube being of a flexible, linearly elongated, hollow configuration, and connecting to said blower discharge outlet;

an air intake, located on said main body, said air intake designed to facilitate the transfer of air from the outside environment to said main body to said discharge tube;

a control means, located on the external surface of said main body, said control means designed to permit multi-speed applications of said gas powered engine, as such, the suction and blowing capacity can be adjusted according to the density of said particulate material; and a plurality of wheels, positioned on the lower surface of said main body, said wheels designed for facilitating ease of movement, thus eliminating the necessity of carrying said main body to and from its operating location.

2. The transport device described in claim 1, wherein said suction tube is releasable secured to said suction inlet, and said discharge tube is releasably secured to said blower discharge outlet.

3. The transport device described in claim 1, wherein said rotary blade provides both the suction, bringing particulate matter into said main body, and acting as a compressed air blower, forcing air outward through said discharge tube.

4. The transport device described in claim 1, wherein said rotary blade is located in said cavity of said main body, and facilitates the movement of air and particulate matter into said main body, through said rotary blade, and out said discharge tube.

5. The transport device described in claim 1, wherein in operation, said device acts as a high-volume transfer system by being able to direct suction tube to said particulate material that is to be moved and being able to direct said discharge tube to a destination, whether it be a transfer vehicle or another location.

6. The transport device described in claim 1, wherein said will accommodate both home and industrial use.

7. The transport device described in claim 1, wherein said main body is comprised of material selected from the group comprising metal and plastic, with said suction tube and discharge tube being constructed of a material selected from the group comprising rubber and plastic.

8. The transport device described in claim 1, in which said gas powered engine is used to drive a high-volume blower system.

9. The transport device described in claim 1, wherein said device is stand alone and does not require gravity feed or manual shoveling to move said particulate matter into said main body.

* * * * *